Patented Nov. 16, 1926.

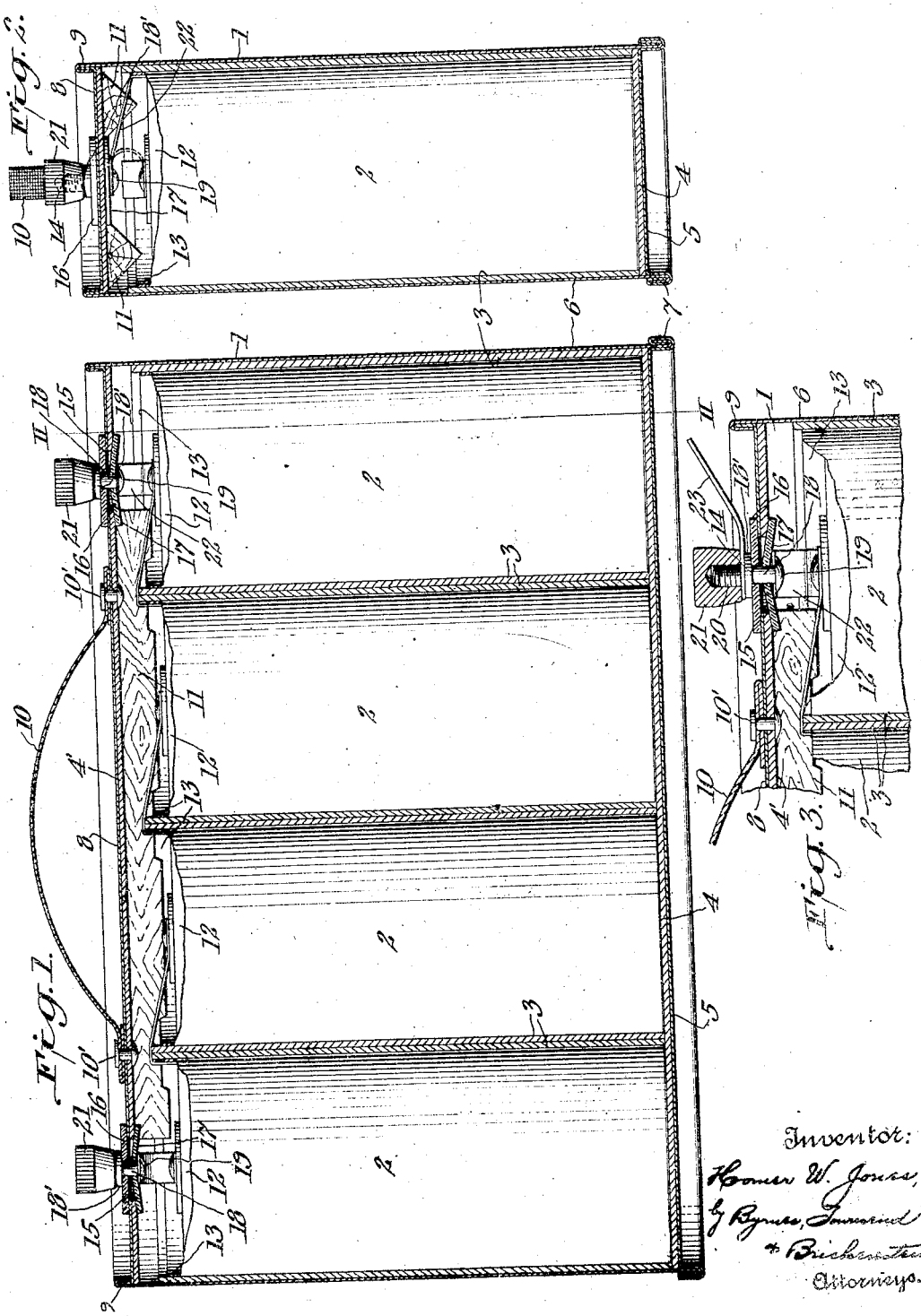

1,607,460

UNITED STATES PATENT OFFICE.

HOMER W. JONES, OF CLEVELAND, OHIO, ASSIGNOR TO NATIONAL CARBON COMPANY INC., A CORPORATION OF NEW YORK.

DRY-CELL BATTERY.

Application filed May 4, 1922. Serial No. 558,536.

This invention relates to electrical batteries in which the cells are laterally alined within a casing. Such batteries comprise one or more rows of cells arranged as compactly as possible and connected to give the voltage or amperage requisite for the intended use. The cells are more or less rigidly secured in position so that the casing may be handled without danger of displacing them.

Cylindrical dry cells are commonly used in batteries of the general type above described. According to prior practice, pitch, wax, or other non-conductive material is filled into the spaces between and about the cells to insulate them and hold them in position. I have discovered that this procedure, heretofore considered essential, may be dispensed with, and have devised an improved and more economical assembly. Means for rigidly securing the cells in a simple and effective manner, together with an improved casing and binding post attachment, are provided by the present invention. Further advantages of the invention will be apparent from the succeeding description, reference being had to the accompanying drawing, in which—

Fig. 1 is a vertical longitudinal section through the battery casing, showing the cells in elevation, Fig. 2 is a transverse section on line II—II, Fig. 1, and Fig. 3 is an enlarged sectional detail view showing the method of attaching the binding posts.

Reference numeral 1 denotes an oblong casing preferably made of resilient sheet metal and having its ends rounded to conform to the contour of cylindrical dry cells 2 of well known type. The length of casing 1 is such that the chosen number of cells may fit snugly therein, and the sides of the casing preferably have a resilient engagement with the cell walls. Each of the cells 2 is encased in an insulating wrapper 3, which may be made of paraffined paper or other suitable material. The cells rest upon a paraffined chipboard sheet 4, which covers the casing bottom 5. The lower margin of the wrapper may abut upon the sheet 4, as shown, or it may be of greater length than the cell and be folded beneath it. In some cases jackets with bottom caps may be used. The number, shape, and arrangement of cells may of course be varied.

Casing 1 is composed of a sheet metal plate bent to form the wall 6 of the casing, and having its abutting ends secured by suitable means, not shown. Wall 6 is united to bottom 5 by a joint 7. Cover 8 is similarly secured by joint 9 at the top of the wall. A handle 10, of any suitable kind, illustrated as a band of cotton webbing, may be secured to the cover 8. Rivets 10' secure the handle and also attach a chipboard lining 4' to the under side of the cover.

The casing is constructed without the use of solder, which has heretofore been the means employed for securing the parts of metal battery cases together. I have found that superior cases may be made with other securing means. In the embodiment of the invention illustrated, the meeting edges of the metal are crimped together to form a waterproof joint. In order that the cells may be seized between the top and bottom of the casing under sufficient pressure to hold them securely, it is in most cases necessary that a joint of the casing shall be completed while the assembly is under compression in a press or the like. Soldering does not adapt itself to such an operation, whereas crimping offers no difficulties. Some methods of welding and riveting, such as those employing electrical heating, can also be used. It will be apparent that the cells may be held between walls of the casing other than those ordinarily considered as the top and bottom. In accordance with my invention, the joint which is completed while the parts are held under compression is made by crimping or its equivalent. The wall which supplies the pressure for holding the cells is not necessarily the last to be put in place.

The means for securing the cells in position comprises chocks 11 of relatively soft and resilient material. Soft wood strips, triangular in cross section, are suitable. One or more strips may be used. The pitch seal 12 of cells 2 does not extend to the top of the zinc container electrodes, and the annular zinc rim 13, thus left exposed at the top of each cell, is caused to cut into the wooden chocks 11 by placing the chocks, apex downward, upon the rims and forcing the cover into closed position. The zinc may be sunk into the wood for a suitable distance, say 1/16 inch. The cover is secured, while under compression, to the side wall of the casing. The wood of the chocks has a certain degree of resilience which operates, after the pressure on the cover has been removed, to force the chocks tightly against the embedded cell walls. Preferably one or more of the metallic casing surfaces is flexed outwardly in the completed assembly, and exerts an inward resilient pressure upon the cells. In the form of the invention illustrated, the metallic cover 8 presses inwardly upon the chocks 11. Other portions of the casing, such as the side walls, might be used to press upon and hold the cells.

Referring especially to Fig. 3, the binding posts 14 are secured to the cover 8 in the following manner: The cover is perforated at 15 and insulating washers 16 and 17 are placed about the perforation, above and below the cover. The lower washer 17 is relatively thin and flexible. A rivet 18 of considerably smaller diameter than the perforation is passed downwardly therethrough and has its lower end 19 expanded against the washer 17. A collar 18' is integral with the rivet and rests upon the upper washer 16. The rivet has a threaded extension 20 which is screwed into a binding post nut 21. When the rivet is drawn up by properly expanding the lower end, the flexible washer 17 is forced between the rivet stem and the cover, effectively insulating these parts from each other and closing the perforation 15. To seal the perforation still more securely, a paraffined paper washer may be placed between cover 8 and lower washer 17, if desired. A connector 22 is secured beneath the head 17 of rivet 18 and is attached to the zinc pole of end cell 2. The opposite terminal rivet is connected to the carbon pole of the opposite end-cell. Connection to the external circuit may be made through a lead 23 suitably attached to the binding post.

In batteries prepared according to this invention, the cells are more securely and permanently held in position than in batteries of the type in which pitch or other plastic is depended upon to hold the cells. Also, the improved battery weighs considerably less than that of the pitch-embedded type having the same cubic content. A better product and marked economy in manufacture result from the elimination of the plastic material and the substitution of the improved means of uniting the sections of the casing.

I am aware that it has been proposed to prepare batteries having cells removably held within a casing by spring means or the like, and I make no claim to such devices. My invention, as regards the cell holding means, resides in the provision of a construction for securely positioning cells in a non-removable manner without the use of pitch or similar materials. Various modifications of the holding means described may be adopted, such as strips secured to the cover, or members not deformed by contact with the zinc cell walls, but having depressions or locking means properly located to engage and hold the cells. Such modifications, and others accomplishing equivalent results, fall within the scope of the invention as defined in the appended claims.

I claim:

1. A battery comprising a casing having a cover, a plurality of cells in the casing, each cell having side walls extended at their top, and a strip of material deformable by pressure and held between the tops of the cell side walls and the casing cover under sufficient compression to deform it.

2. A battery comprising a casing, a plurality of cylindrical dry cells in said casing, each of said cells having the rim of its zinc cup upstanding above its seal, a plurality of penetrable strips having a narrowed surface contiguous to the rims, and a cover for said casing adapted to be forced inward to cause said rims to cut into said strips.

3. A battery comprising a casing, a metallic cover therefor having a perforation, a flexible washer disposed on one side of said perforation, a headed metallic member passing through said perforation, said member and head both being considerably smaller than the perforation, said head being forced against said washer, whereby the washer is caused to enter the perforation about the member and insulate the same from the cover, and means for connecting the member to a cell of the battery.

4. The invention according to claim 3, in which a relatively stiff washer is placed about the perforation on the side opposite to the flexible washer.

5. In a multi-cell battery unit, a sheet metal casing and a cover therefor, a series of battery cells arranged side by side in line within the casing and having center and shell contacts, substantially aligned straps connecting said cells in series, and an insulating spacer block straddling said connecting straps and compressed by said cover upon the cells to maintain the latter against displacement within the casing.

6. In a multi-cell battery unit, a sheet metal casing and a cover therefor, a series of battery cells arranged side by side in line within the casing and having center and shell contacts, insulating jackets surrounding the shell of said cells and extending above the same, straps passing over said jackets and serving to connect the cells in series, together with an insulating spacer block straddling said straps and compressed by said cover upon the cells to maintain the latter against displacement within the casing.

7. A multi-cell battery comprising a casing having a cover, a series of cells arranged therein and provided with up-standing jackets of crushable insulating material, in combination with a spaced block of insulating material interposed between said cells and the cover and being longitudinally recessed on its cell-face to present relatively sharp longitudinal edges adapted to crush the cell jackets at the point of contact therewith under the pressure of the cover.

8. A battery comprising a plurality of cells, each comprising a zinc cup member, a container having an elastic wall in which said cells are permanently encased, and crushable means held under compression between the edge of the zinc cup of each cell and said elastic wall under sufficient compression to deform said crushable means and to flex said elastic wall.

In testimony whereof, I affix my signature.

HOMER W. JONES.